United States Patent [19]

Shirley, Jr. et al.

[11] Patent Number: 4,926,497
[45] Date of Patent: May 15, 1990

[54] RADIO ALIGNMENT/PROGRAMMING DEVICE

[75] Inventors: Thomas F. Shirley, Jr.; John S. Ruppel, both of Fort Worth; Thomas J. Zuiss, Watauga; Jeffrey A. Battin, Haltom City, all of Tex.

[73] Assignee: Motorola, Inc., Schaumburg, Ill.

[21] Appl. No.: 175,003

[22] Filed: Mar. 30, 1988

[51] Int. Cl.$^5$ .......................................... H04B 17/00
[52] U.S. Cl. ..................... 455/67; 455/186; 455/226
[58] Field of Search ................. 455/186, 185, 67, 226

[56] References Cited

U.S. PATENT DOCUMENTS

| | | | |
|---|---|---|---|
| 4,310,924 | 1/1982 | Miyasaka et al. | 455/186 |
| 4,525,865 | 6/1985 | Mears | 455/186 |
| 4,739,486 | 4/1988 | Soderberg et al. | 364/464 |
| 4,771,399 | 9/1988 | Snowden et al. | 455/186 |
| 4,792,986 | 12/1988 | Garner et al. | 455/186 |

OTHER PUBLICATIONS

The MC Micro Field Programmer Handbook, dated 1985 by Motorola GmbH Taunsstein.
Systems 9000 Trunked Radio Programmer, dated 1986 by Motorola, Inc.
Systems 9000 Conventional Options Programmer 1985, Motorola, Inc.
Systems 9000 Conventional 64 Mode Radio and Control Head Programmer, dated Nov. 12, 1985.
Systems 9000 Conventional 32 Mode Radio and Control Head Programmer, dated Nov. 12, 1985.
EEPROM Programmer, (Instruction Manual No. 68P06088T60-0, published in 1984).
Users Manual for Programming the Mostar NVR, (Manual No. 68P80100W88-0, published in 1985).
HT600 Programmer/Tuner User's Manual, (Manual No. 68P81045C55-2).
SMARINET Standalone Field Programmer Model T5124A, (Programming Information Guide 68P-811-17E11-0 published in 1985).
Systems 9000 Conventional Radio Programmer Operator's Manual, (Manual No. 68-80309B24-0, published in 1986).
Systems 9000 Conventional Control Head Programmer Operator's Manual, (Manual No. 68-80309B25-0, dated May 15, 1986).
Systems 9000 Trunked Control Head Programmer Operator's Manual, (Operator's Manual No. 68-80309B-26-0, dated May 15, 1986).

*Primary Examiner*—Joseph A. Orsino
*Assistant Examiner*—Frank M. Scutch, III
*Attorney, Agent, or Firm*—Steven G. Parmelee

[57] ABSTRACT

A programming station for aligning two-way radios. The station allows alignment of various radio control functions through use of a menu driven format. A relative value display is provided for many of the alterable values.

16 Claims, 7 Drawing Sheets

RADIO ALIGNMENT/PROGRAMMING DEVICE

COPYRIGHT INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to the programming and servicing of two-way radios.

BACKGROUND ART

Two-way radios are becoming increasingly sophisticated. Many such radios now realize many operating functions and features through provision of an on-board microprocessor. For example, some models of the Spectra radio, manufactured by Motorola, Inc., do not include any internal adjustable components such as potentiometers or coils. Instead, all RF and signalling parameters are controlled by an on-board microprocessor.

These increasingly sophisticated radios have given rise to a concurrent need for a similarly sophisticated means of servicing the radio, particularly in conjunction with alignment procedures.

SUMMARY OF THE INVENTION

These and other needs are substantially met through provision of the radio alignment/programming device disclosed herein.

This device is intended for use with two-way radios that have a memory for storing at least some radio control parameters, and an internal computer for controlling at least some radio control functions in response to the stored parameters.

The device includes an appropriate coupling mechanism to allow access to at least the memory in the radio, and a programming station for communicating with the radio via the coupling mechanism. The programming station allows an operator to access the memory and write radio control parameters thereto in support of alignment procedures.

In one embodiment of the invention, the programming station provides a display that represents a relative minimum value of a particular radio control parameter, a relative maximum value for that parameter, and a relative present value of that parameter. The minimum and maximum values are ascertained by the programming station from information stored in the radio's memory. Because this display represents a relative value, the display appears substantially identical from screen to screen, and will not vary in overall appearance from one alignment process to another. This function is autoranging, however, such that the minimum and maximum values retrieved from the radio will be properly represented at the end points of the display. This provides a valuable user friendly tool for the operator.

In another embodiment of the invention, the programming station can cause the radio to transmit during certain alignment procedures, and will further automatically cause the radio to terminate such transmissions in response to a timer.

BEST MODE FOR CARRYING OUT THE INVENTION

Figure 1:
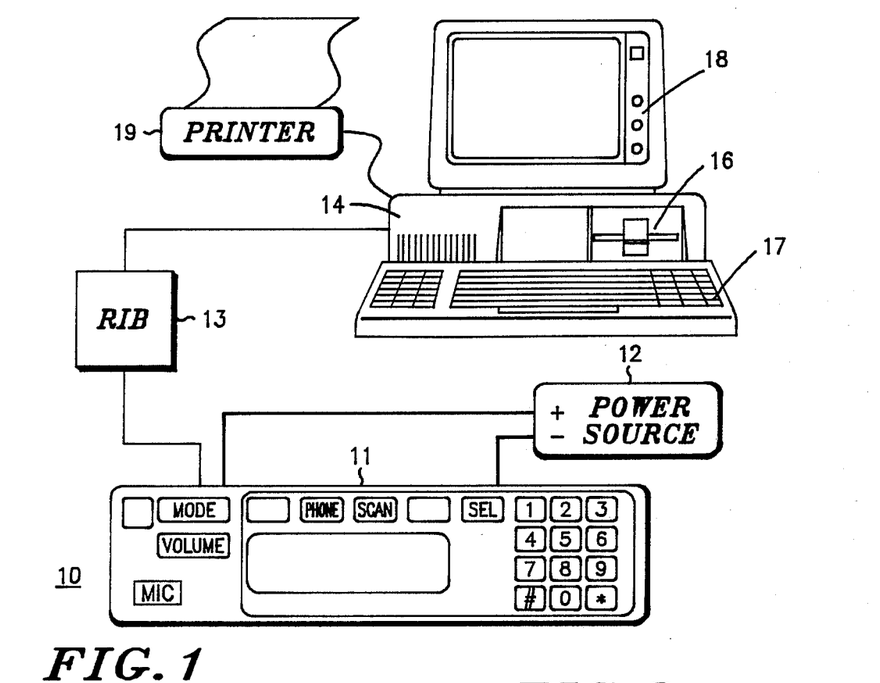
FIG. 1 comprises a block diagram depiction of the invention as coupled to a two-way radio.

Referring now to FIG. 1, the programming station, depicted generally by the numeral 10, operates in conjunction with an appropriate two-way radio (11). The radio (11) connects to an appropriate power source (12) and the programming station (10) couples to the radio (11) through an appropriate coupling mechanism; in this case, a radio interface box (13). Each of these components will now be described in more detail in seriatim fashion.

The radio (11) may be, for example, a Spectra brand two-way land mobile radio as manufactured and sold by Motorola, Inc. Such a radio has an internal microprocessor for controlling its radio control functions. (As used herein, "radio control functions" refers to radio specific performance parameters, such as deviation, reference oscillator, transmit power, signalling deviation, and so forth.)

The microprocessor in the radio communicates with other devices within the radio and external to the radio on a serial bus. The radio interface box (13) functions to level shift the RS232 voltage level signals that are output and received by the programming station (10) to an appropriate signal level that is compatible with the radio's serial bus interface.

The radio interface box (13) may be provided through use of Part No. 01-80353A74. The cable between the radio interface box (13) and the radio (11) may be provided through use of Part No. 30-80369B73. The cable between the radio interface box (13) and the programming station (10) may be provided through use of a Part No. 30-80369B71. All of the above noted parts are manufactured and sold by Motorola, Inc.

The programming station (10) can be comprised of an IBM personal computer or compatible (14), which includes at least one RS232 port, 512 K RAM, and a DOS 3.09 operating system. In addition, at least one disk drive (16), a keyboard (17), a display screen for displaying alphanumeric information (18) and a printer. (19) should be provided.

Figure 2:
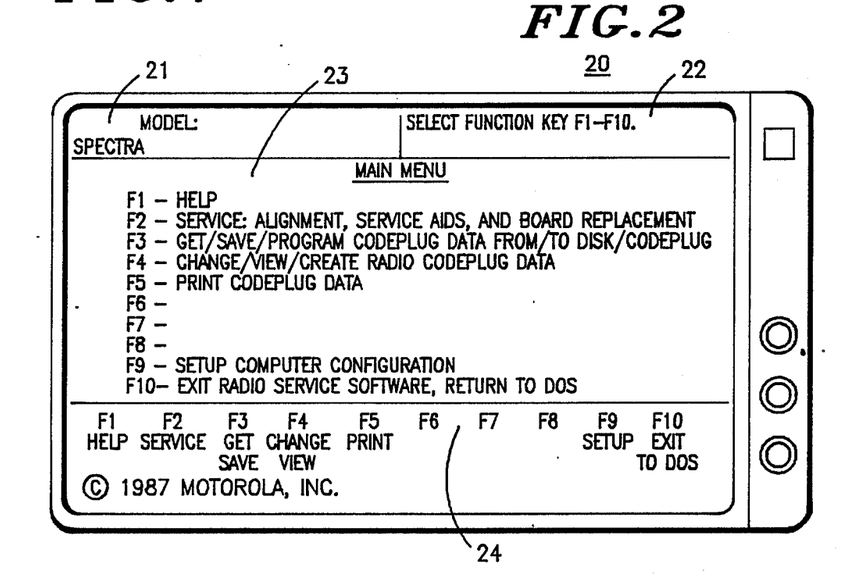
FIG. 2 comprises a depiction of a main menu as presented at the programming station.

Referring now to FIG. 2, most actions of the programming station (10) are controlled through the use of formatted screen displays and the function keys ordinarily found on the keyboard (17) (i.e., F1–F10). In general, all screens provided at the programming station (10) use an identical format, with the screen being divided into four dedicated sections (these sections can be segregated from one another by use of differing background colors or distinct border lines).

The first dedicated section comprises a box (21) in the upper left hand corner. This box (21) displays the radio's trademark (in this case, "Spectra") or other desired indicia, along with the model number (or other radio type indicia) of the radio as read from the radio's memory (the model number is not displayed in FIG. 2 but can be seen in FIG. 4).

The second dedicated section comprises a box in the upper right hand corner (22) that displays an indication of a generic type of input that the programming station (10) expects at that time from the use. For example, as depicted in FIG. 21, the words "Select Function Key F1–F10" instruct the operation that one of the indicated function keys must be actuated to select a desired operation. Also, error messages and data entry errors are displayed in this box (22) when necessary.

The third dedicated section comprises a large center box (23) that contains menu descriptions or data entry fields, depending upon the function currently in progress. FIG. 2 displays the main menu in this section (23). The main menu indicates the other functions that can be accessed through use of the function keys.

Finally, the fourth dedicated section comprises an area at the bottom (24) of the screen. This section (24) provides an abbreviated indication of each function key operation. In general, the location of this display indicia coincides with the general location of the function keys themselves as an additional aid to the operator.

Figure 3:
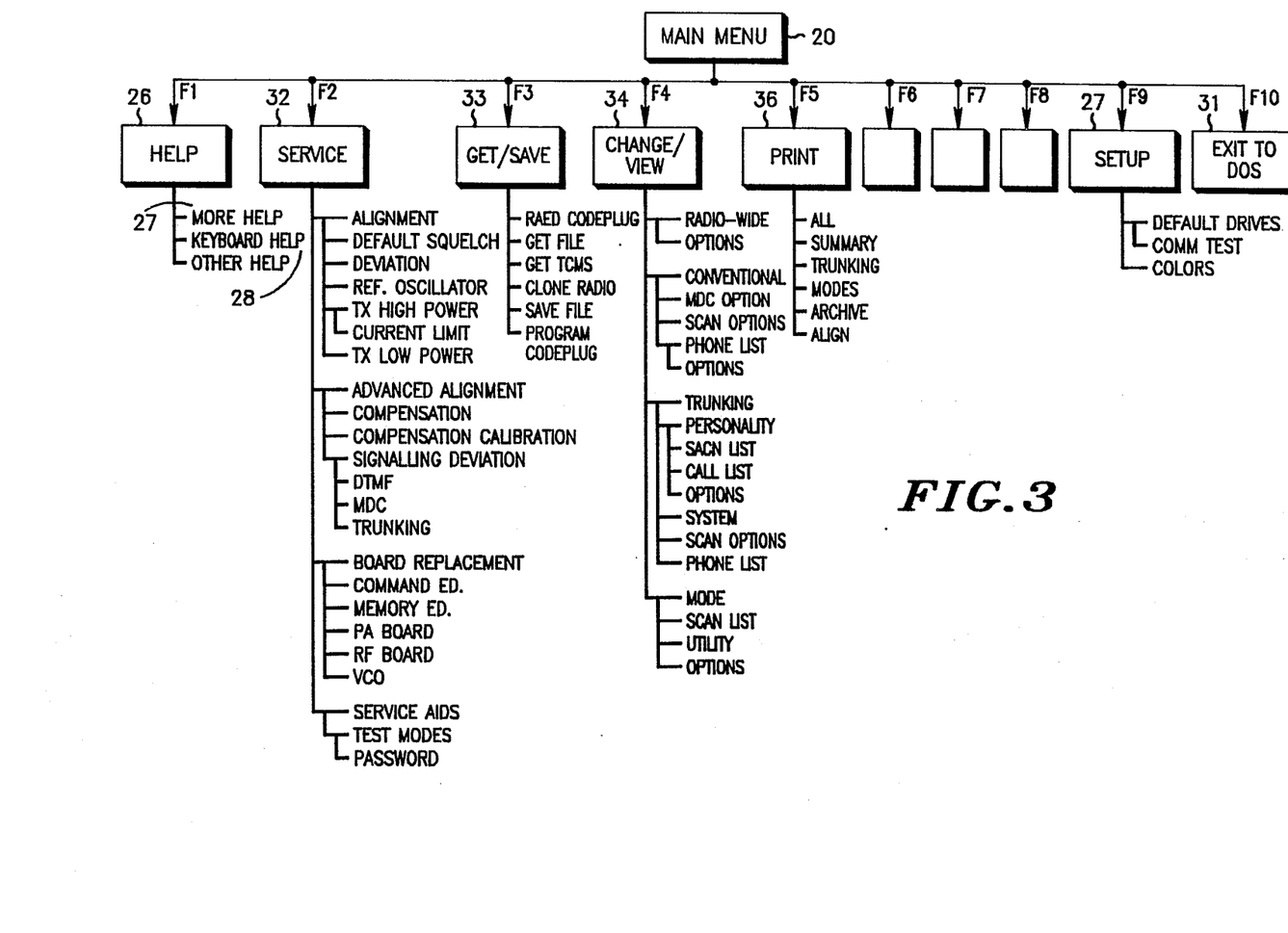
FIG. 3 comprises a diagrammatic representation of the functional capabilities of the programming station.

With reference to FIG. 3, the programming station (10) provides screens and functions organized as depicted. The system will not allow an operator to randomly jump from one screen or function to another. Instead, the operator must move up and down the branches by using the menu screens and function keys in an appropriate manner. For example, pushing the F1 function key will provide a help function (26) which in turn leads to various other help options, including "more help" (27) and "keyboard help"(28). The help options provide helpful supplemental information regarding the operation of the programming station (10) to the user.

In addition to the help function (26), the main menu (20) provides access to an initial setup function (29) and an exit routine (331). The main menu (20) also allows access to four important service and programming menus: service (32), get/save (33), change/view (34), and print (36). (Additional information regarding the service function (32), the get/save functions (33) and the print function (36) can be found in copending U.S. patent application Ser. No. 175,084, filed on Mar. 30, 1988 and entitled Radio Programming Device, Ser. No. 0/175,361, filed on Mar. 30, 1988, and entitled Radio Component Replacement/Programming Device, and Ser. No. 0/175,002, filed on Mar. 30, 1988, and entitled Radio Programming Device With Access To A Remote Database, which applications are incorporated herein by this reference.)

In general, the service function (32) comprises a multilevel menu routine that supports radio alignment, advanced alignment, board replacement, and service aids functions. All service screens access the memory in the radio directly, and it is not necessary to read the radio's memory via the get/save function (33) before using the service screens. All service screens use the same four dedicated screen sections described earlier.

The get/save function (33) generally functions to read radio control and radio feature parameters as stored in a radio's memory, and to obtain archived parameter information from a diskette or hard disk. However obtained, the change/view function (34) can then be used to edit the parameter information. The get/save function (33) also operates to write modified parameter information into the radio's memory, or to save the modified parameters to an archive file on a diskette or hard disk.

Finally, the print function (36) allows production of permanent records of parameter configurations.

Figure 4:
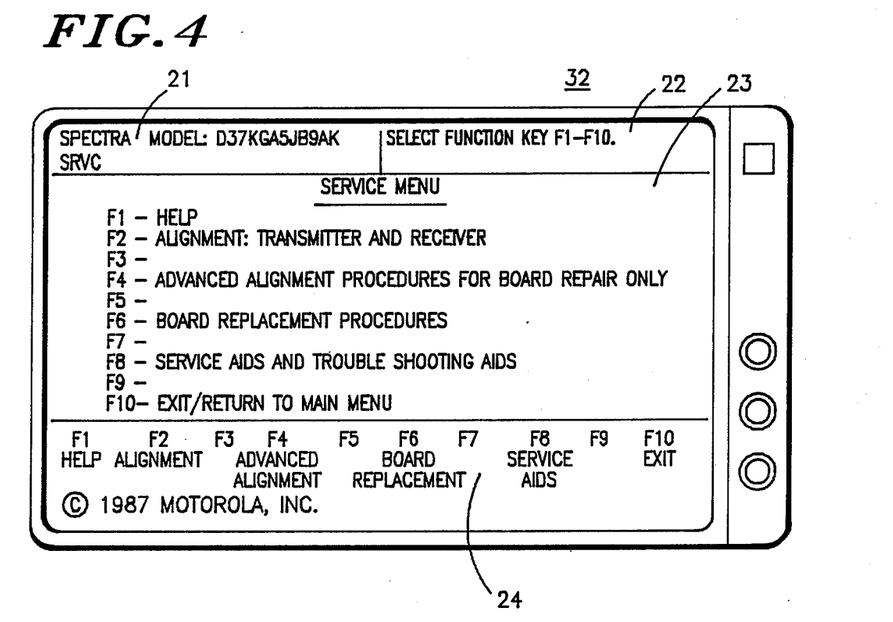
FIG. 4 comprises a depiction of a service menu as presented at the programming station.

Referring now to FIG. 4, the service function (32) will be described in more detail.

All radio alignment and board replacement procedures are accessed from the service menu (32) radio must be connected to the programming station (10) and the radio must be active before the programming station (10) will allow a user to access the service menu (32). Also, all service screens read and program the radio's memory directly. The user does not need the get/save functions (33) to use the service features.

Figure 5:
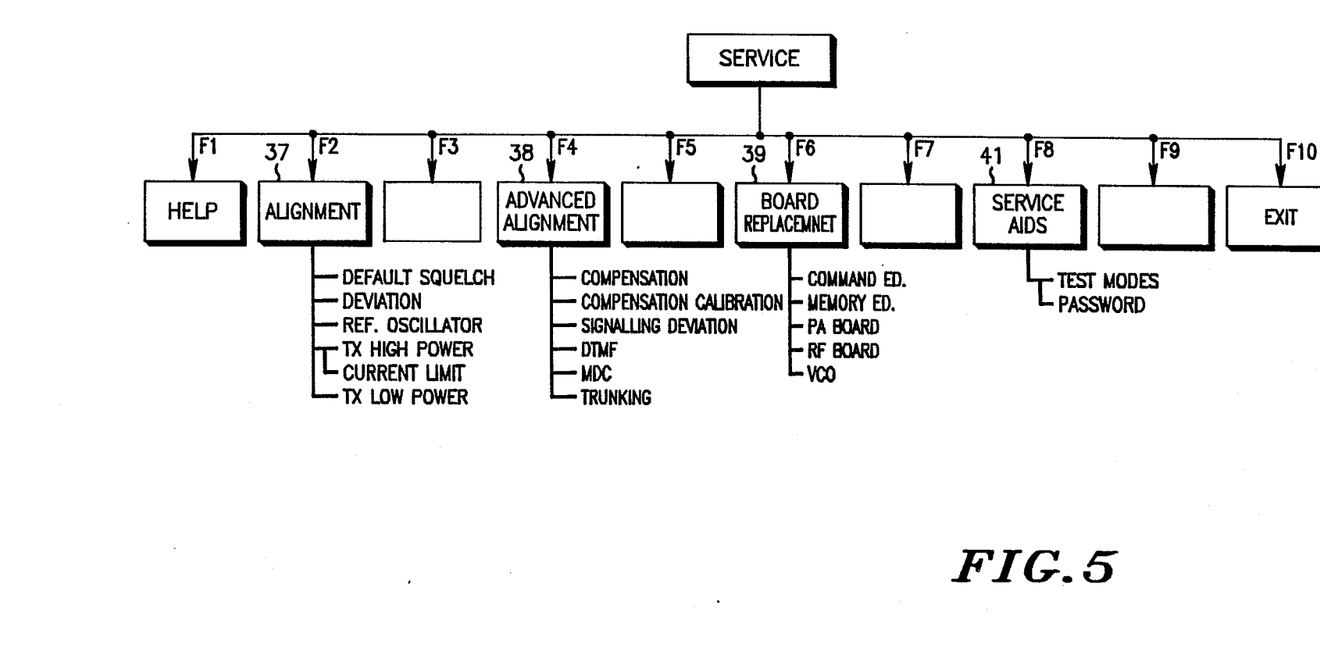
FIG. 5 comprises a diagrammatic representation of the functional capabilities available at the programming station from the service menu.

From the service menu (32), a user can select function key F1 for help. Function key F2 can be selected to initiate the alignment functions. With reference to FIG. 5, the alignment function (37) allows adjustment of default squelch, transmitter VCO deviation, reference oscillator warp, transmitter power set (both high and low) and transmitter current limit. (More detail regarding the alignment functions (37) will be provided below.)

With reference to both FIGS. 4 and 5, function key F4 can be selected to initiate certain advanced alignment functions (38). These include transmitter VCO compensation adjustment, transmitter VCO compensation calibration, and signalling deviation adjustments as may be relevant.

Function key F6 initiates the board replacement function (39). This function allows servicing of the radio when board repairs and/or replacement is necessary. Special initialization procedures and step by step instructions are given for all realignment procedures when replacing or servicing the command board, the memory board, the power amplifier board, the RF board, or the VCO board.

Finally, the F8 function key initiates a service aids function (41) that interacts with special test capabilities that may be designed into the radio itself.

Figure 6:
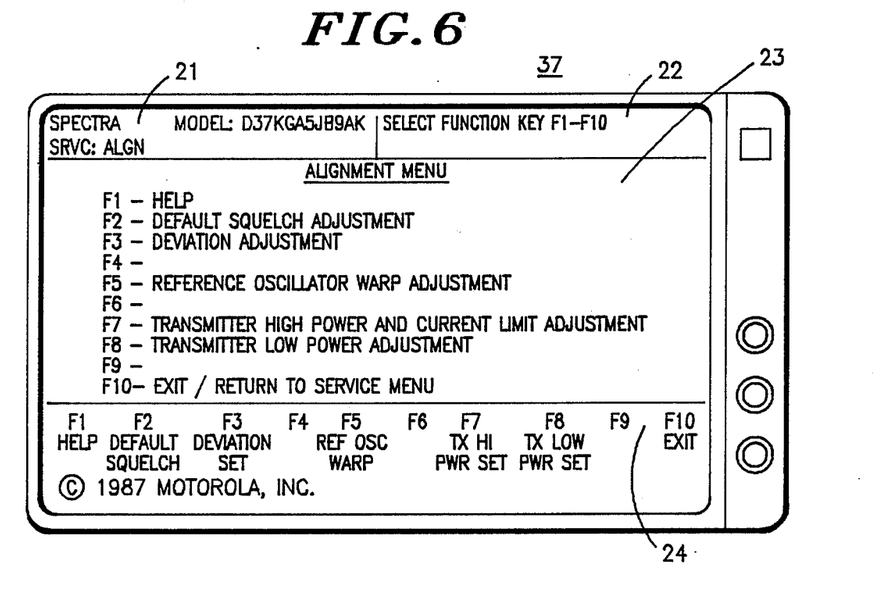
FIG. 6 comprises a depiction of an alignment menu as presented at the programming station.

Returning again to FIG. 4, selection of the F2 function key from the service menu (32) will initiate the alignment function (37) as mentioned earlier. With reference to FIG. 6, this means presentation at the programming station (10) of the alignment menu screen as depicted. From this menu, the user can select proper alignment procedures that relate to alignment and/or adjustment of the default squelch (function key F2), deviation (function key F3), reference oscillator warp (function key F5), transmitter high power and current limit (function key F7), and transmitter low power (function key F8).

Figure 7:
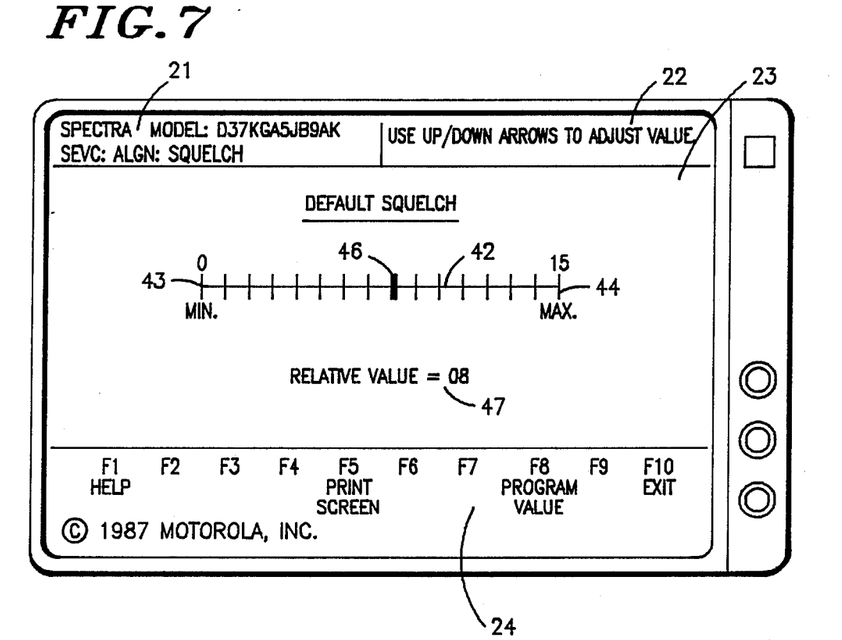
FIG. 7 comprises a depiction of a default squelch alignment screen as presented at the programming station.

As indicated above, selection of the F2 function key from the alignment menu (37) will select the default squelch adjustment function. This will result in provision of the default squelch adjustment screen as depicted in FIG. 7. (The default squelch setting constitutes the squelch setting which the radio initially uses following application of power. Once the radio has been switched on, the squelch can be adjusted from the control head front panel by the user. When the radio has again been switched off and then switched on again, the default squelch setting will again be the initial squelch value.)

FIG. 7 includes a depiction of a relative present value display that comprises a linear scale (42) which indicates a relative minimum value (43), a relative maximum value (44), and a relative present value (46) of a particular monitored parameter. In addition, an alphanumeric representation (47) is provided for the relative present value as well.

Through use of the up and down arrow keys on the programming station's keyboard (17), the user can alter a radio control parameter in the radio. As these modification keys are used, the relative present value (46) will similarly increase or decrease in relation to the changes in the actual parameter in the radio. For example, when making a default squelch adjustment, pressing the up arrow increases the setting and an instruction is provided to the radio's microprocessor to increase the value of the parameter.

In all cases, the relative present value (46) constitutes only a relative number, which corresponds to a digital-to-analog generated voltage in the radio. Standard measurement procedures with related relevant test equipment remain applicable and are not affected in any way. In general, the provision of this standard relative present value display from screen to screen allows an operator to make adjustments to the radio through use of a simple and readily understood tool.

Once the appropriate value has been selected, the user then selects the F8 function key to cause the desired value to be programmed into the radio. The user then may select the F10 function key to return to the alignment menu (37).

Figure 8:
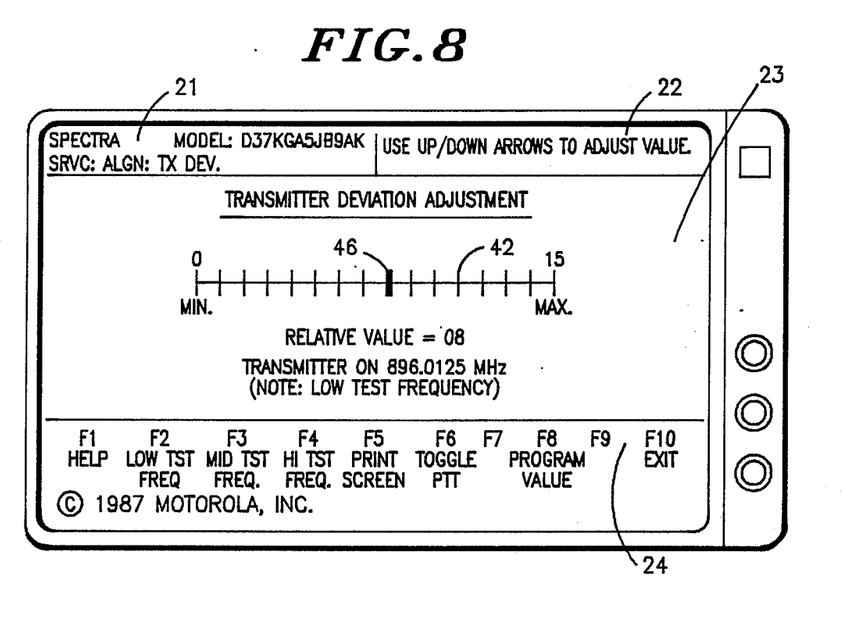
FIG. 8 comprises a depiction of a transmitter deviation adjustment screen as presented at the programming station.

By selecting the F3 function key from the alignment menu (37), the deviation adjustment screen will be presented as depicted in FIG. 8. Adjustments such as transmitter deviation are made when the radio has been keyed (i.e., the radio has been caused to transmit). To facilitate this, the user can cause the radio to key from the programming station (10) by selecting the F6 function key. The radio will then begin transmitting and continue transmitting for three minutes, or until the user again selects the F6 function key to cause transmission to cease.

In the transmitter deviation adjustment mode, the programming station (10) will initially cause the transmission to occur at a low test frequency (in the example depicted, 896.0125 megahertz). The programming station (10), however, also allows the user to select any of three test frequencies through selection of function keys F2, F3 and F4 (these being a low test frequency as indicated earlier, a midrange test frequency, and a high test frequency, respectively).

If the user should manually cause the radio to transmit (i.e., by closing the push-to-talk switch normally associated with such a radio), the programming station (10) will display a warning to inform the user that the radio should only be keyed through the programming station (10). This warning is particularly pertinent to some service procedures that require special test frequencies as described.

Also, when making such adjustments to the radio, the radio should be connected to an appropriate service monitor, and the transmissions should be directed into either a 50 ohm load or the service monitor itself.

To perform the transmitter deviation adjustment, the user keys the radio by selecting function key F6, and then uses the up/down arrow keys on the keyboard (17) to increase/decrease the deviation value. The relative present value display represents a relative deviation value as explained above, and a precise value for transmitter deviation can be determined from the service monitor.

Measurement of deviation should first be made in the low test frequency mode, and then repeated in the mid and high test frequency modes, through appropriate selection of the F2, F3 and F4 function keys. The test mode exhibiting the highest deviation reading should then be selected, and transmitter deviation then appropriately adjusted using the up/down arrow keys on the programming station keyboard (17) as described above.

If the radio's transmissions have not already automatically terminated, function key F6 can be selected to dekey the radio. The F8 function key can then be selected to cause the alignment value to be programmed into the radio.

Figure 9:
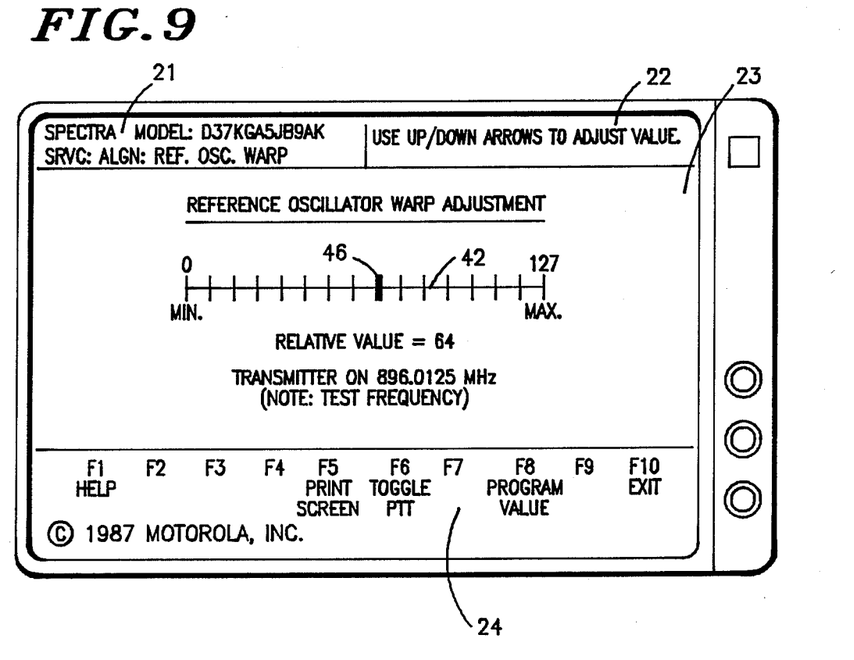
FIG. 9 comprises a depiction of a reference oscillator warp adjustment screen as presented at the programming station.

By selecting the F5 function key from the alignment menu (37), the user can initiate the reference oscillator warp adjustment function. Selection of this function key causes the reference oscillator warp adjustment screen as depicted in FIG. 9 to be presented at the programming station (10). (Before making the reference oscillator warp adjustment, the internal circuitry of the radio should be at room temperature. In addition, the radio should not have become heated from transmitting or operating at a loud audio setting.)

The reference oscillator in the radio is appropriately warped by first keying the radio through selection of the F6 function key. The user then uses the up/down arrow keys on the keyboard (17) to make the adjustment. If desired, the user can use the shift key in conjunction with the up/down arrow keys to increase the adjustment speed. During this process, the radio will be caused to transmit on a preselected test mode frequency.

The relative present value display (42) will again display a relative warp value. The actual transmitter frequency can be determined from an appropriate frequency counter or service monitor as connected to the radio in a known manner.

When the process has been completed, the radio is dekeyed (either through the time out feature or through selection of the F6 function key) and the value programmed to the radio through selection of the F8 function key.

Figure 10:
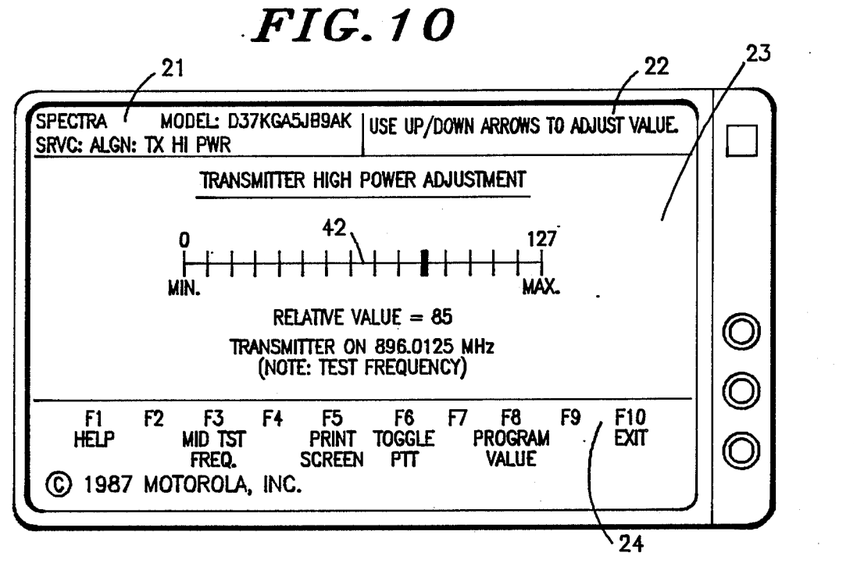
FIG. 10 comprises a depiction of a transmitter high power adjustment screen as presented at the programming station.

By selecting the F7 function key from the alignment menu (37), the user can select the transmitter high power adjustment and current limit adjustment function. This will cause the transmitter high power adjustment screen as depicted in FIG. 10 to be presented at the programming station (10).

The radio is again keyed through selection of the F6 function key, and the up/down arrow keys used to increase or decrease power respectively. Again, the shift key can be used in conjunction with the up/down keys to increase the adjustment speed. A relative value for the transmit power will be displayed on the relative present value display (42). The actual transmitter power output can be determined through use of an appropriate service monitor.

When the transmitter power has been appropriately adjusted, the F8 function key can be selected to program the value in the radio. The F3 function key can then be utilized to initiate the current limit adjustment function, which causes provision of the power amplifier current limit adjustment screen (FIG. 11) to be presented at the programming station (10).

Figure 11:
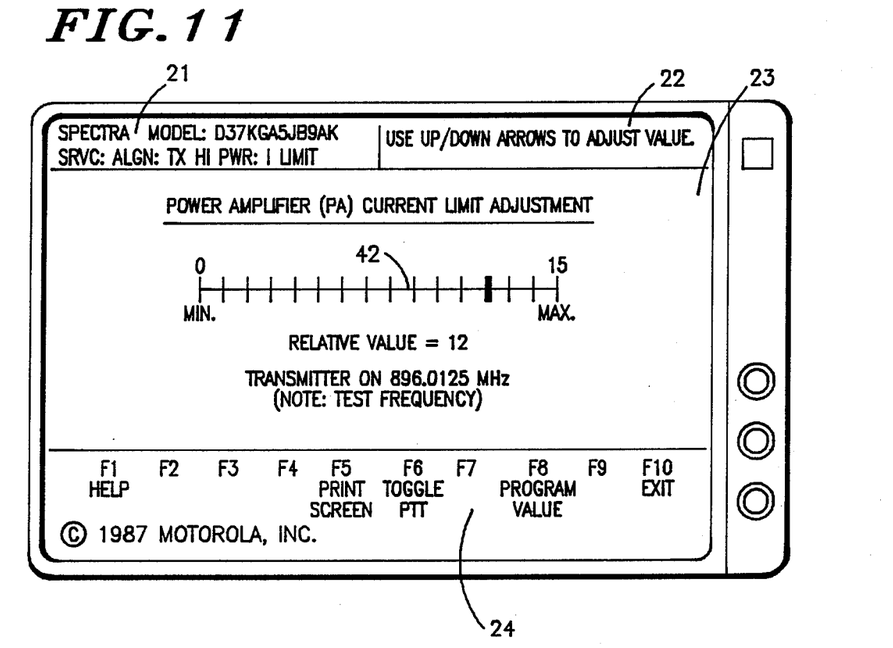
FIG. 11 comprises a depiction of a power amplifier current limit adjustment screen as presented at the programming station.

Again, the radio is keyed, and the up/down arrows used to increase or decrease the power amplifier current limit adjustment. A relative value will be displayed, and the actual transmitter power output can be determined from the service monitor. When completed, the program value is entered into the radio through use of the F8 function key, and the process exited through use of the F10 function key.

Figure 12:
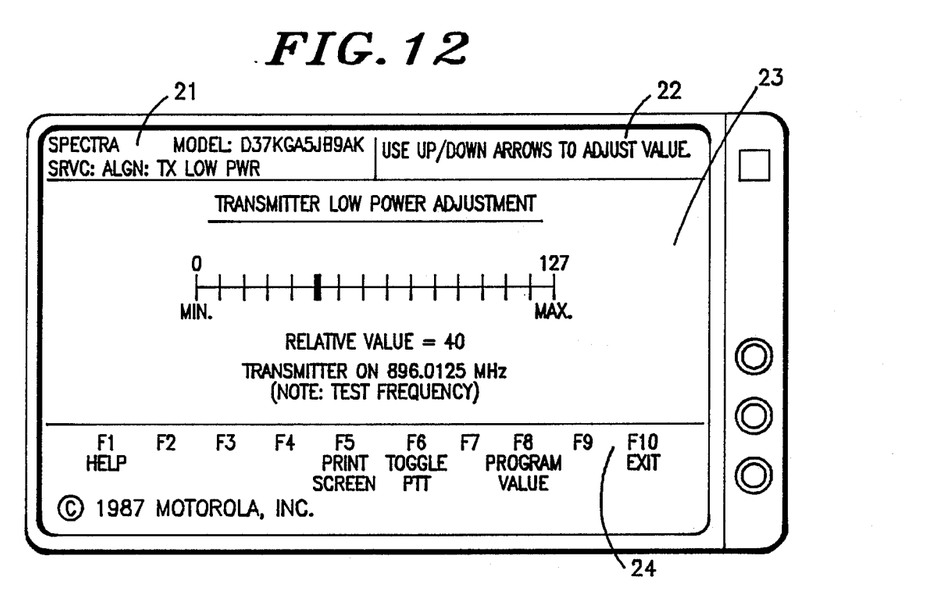
FIG. 12 comprises a depiction of a transmitter low power adjustment screen as presented at the programming station.

Finally, the F8 function key can be selected from the alignment menu (37) to allow access to the transmitter low power adjustment function. This will cause provision of the transmitter low power adjustment screen as depicted in FIG. 12.

As before, this parameter is adjusted by keying the radio through use of the F6 function key, and increasing or decreasing the parameter through use of the up/down arrow keys. A relative value for the parameter will be displayed, and the actual transmitter power output can be determined through use of a service monitor. The value is stored to the radio through use of the F8 function key, and the process exited through use of the F10 function key.

We claim:

1. A device for programming radios, which radios include:
    memory means for storing at least some radio control parameters; and
    means for controlling at least some radio control functions in response to said radio control parameters;
    said device comprising:
    (A) coupling means for coupling to said memory means; and
    (B) programming means for connecting to said coupling means and for:
        accessing said memory means to read at least one of said radio control parameters;
        displaying a relative minimum value for said read radio control parameter, a relative maximum value for said read radio control parameter, and a relative present value for said read radio control parameter;
        changing said radio control parameter;
        storing said changed radio control parameter in said memory means.

2. The device of claim 1 wherein said programming means causes said display of said relative present value for said read radio control parameter to vary as said radio control parameter is changed.

3. The device of claim 2 wherein said programming means includes input means for selectively causing said relative present value to vary.

4. The device of claim 3 wherein said input means includes a first input device for causing said relative present value to vary at a first rate.

5. The device of claim 4 wherein said input means further includes a second input device for causing said relative present value to vary at a rate faster than said first rate.

6. The device of claim 2 wherein said relative present value varies at a first rate.

7. The device of claim 6 and further including rate change means for causing said relative present value to vary at a second rate that is different from said first rate.

8. The device of claim 7 wherein said second rate is faster than said first rate.

9. The device of claim 1 wherein said programming means displays said relative minimum, maximum, and present values for said radio control parameter as a graphic depiction.

10. The device of claim 9 wherein said programming means also displays said relative present value for said radio control parameter in a numeric format.

11. The device of claim 10 wherein said graphic depiction and said numeric format are displayed simultaneously.

12. The device of claim 1 wherein said programming means includes input means for causing said radio to emit RF transmissions.

13. The device of claim 12 and further including timer means for causing said radio to cease transmitting said RF transmissions after a predetermined period of time.

14. The device of claim 12 wherein said input means causes said radio to emit RF transmissions at a first frequency.

15. The device of claim 14 wherein said input means also selectively causes said radio to emit RF transmissions at a second frequency that is different than said first frequency.

16. The device of claim 15 wherein said input means selectively causes said radio to emit RF transmissions at a third frequency that is different from either of said first and second frequencies.

* * * * *